(12) United States Patent
Murphy

(10) Patent No.: US 7,946,806 B2
(45) Date of Patent: May 24, 2011

(54) GAS TURBINE ENGINE SYSTEMS AND RELATED METHODS INVOLVING HEAT EXCHANGE

(75) Inventor: Michael Joseph Murphy, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 895 days.

(21) Appl. No.: 11/870,061

(22) Filed: Oct. 10, 2007

(65) Prior Publication Data

US 2009/0097972 A1    Apr. 16, 2009

(51) Int. Cl.
*F01D 25/08* (2006.01)

(52) U.S. Cl. ........ 415/145; 415/151; 415/176; 415/178; 415/191; 415/211.2; 60/39.83; 60/806

(58) Field of Classification Search .................. 415/176, 415/178, 151, 145, 191, 211.2; 60/39.83, 60/806
See application file for complete search history.

(56) References Cited

U.S. PATENT DOCUMENTS

| | | | |
|---|---|---|---|
| 4,254,618 A * | 3/1981 | Elovic | 60/226.1 |
| 4,773,212 A * | 9/1988 | Griffin et al. | 60/772 |
| 5,123,242 A * | 6/1992 | Miller | 60/226.1 |
| 5,203,163 A * | 4/1993 | Parsons | 60/226.1 |
| 5,269,135 A | 12/1993 | Vermejan et al. | |
| 5,403,157 A | 4/1995 | Moore | |
| 5,996,331 A | 12/1999 | Palmer | |
| 6,035,627 A * | 3/2000 | Liu | 60/785 |
| 6,058,696 A | 5/2000 | Nikkanen et al. | |
| 6,106,229 A | 8/2000 | Nikkanen et al. | |
| 6,912,895 B1 | 7/2005 | Jaeger | |
| 7,195,055 B1 | 3/2007 | Jaeger | |
| 7,237,386 B2 | 7/2007 | Hoffmann et al. | |
| 2006/0162706 A1 | 7/2006 | Rosin et al. | |
| 2007/0101731 A1 | 5/2007 | Bayt et al. | |

* cited by examiner

*Primary Examiner* — Ninh H Nguyen
(74) *Attorney, Agent, or Firm* — Carlson, Gaskey & Olds PC

(57) ABSTRACT

Gas turbine engine systems and related methods involving heat exchange are provided. In this regard, a representative heat exchange system for a gas turbine engine includes: a heat exchanger; and a flow restrictor operative to selectively restrict a flow of gas flowing along an annular gas flow path; in an open position, the flow restrictor enabling gas to flow along the gas flow path and, in a closed position, the flow restrictor restricting the flow of gas such that at least a portion of the gas is provided to the heat exchanger, the heat exchanger being located radially outboard of the flow restrictor.

20 Claims, 3 Drawing Sheets

GAS TURBINE ENGINE SYSTEMS AND RELATED METHODS INVOLVING HEAT EXCHANGE

STATEMENT REGARDING FEDERALLY SPONSORED RESEARCH AND DEVELOPMENT

The U.S. Government may have an interest in the subject matter of this disclosure as provided for by the terms of contract number 5105620-2598.

BACKGROUND

1. Technical Field

The disclosure generally relates to gas turbine engines.

2. Description of the Related Art

Gas turbine engines incorporate heat exchangers for a variety of purposes. By way of example, heat exchangers can be used to transfer heat from lubrication oil to fuel in order to melt ice present in the fuel. In other applications, heat exchangers are used to transfer heat from lubrication oil to air that can be provided as exhaust or used for aircraft environmental systems.

SUMMARY

Gas turbine engine systems and related methods involving heat exchange are provided. In this regard, an exemplary embodiment of a heat exchange system for a gas turbine engine comprises: a heat exchanger; and a flow restrictor operative to selectively restrict a flow of gas flowing along an annular gas flow path; in an open position, the flow restrictor enabling gas to flow along the gas flow path and, in a closed position, the flow restrictor restricting the flow of gas such that at least a portion of the gas is provided to the heat exchanger, the heat exchanger being located radially outboard of the flow restrictor.

An exemplary embodiment of a gas turbine engine comprises: an annular gas flow path; and a heat exchange system having a heat exchanger and a flow restrictor; the flow restrictor being located along the gas flow path and being operative to selectively restrict a flow of gas flowing along the gas flow path; in an open position, the flow restrictor enabling gas to flow along the gas flow path and, in a closed position, the flow restrictor restricting the flow of gas such that at least a portion of the gas is provided to the heat exchanger.

An exemplary embodiment of a method for providing heat exchange in a gas turbine engine comprises: directing a flow of gas along an annular gas flow path; selectively restricting the flow of gas; redirecting at least a portion of the gas; and extracting heat from the portion of the gas that was redirected.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems and related methods involving heat exchange are provided, several exemplary embodiments of which will be described in detail. In this regard, some embodiments involve selectively redirecting the flow of gas from a tip rotor to a heat exchanger that incorporates an annular arrangement of heat exchange elements. By controlling the ability to redirect the gas along the gas flow path, heat exchange functionality can be provided, while enabling the pressure of the gas downstream of the tip rotor to be controlled.

Figure 1:
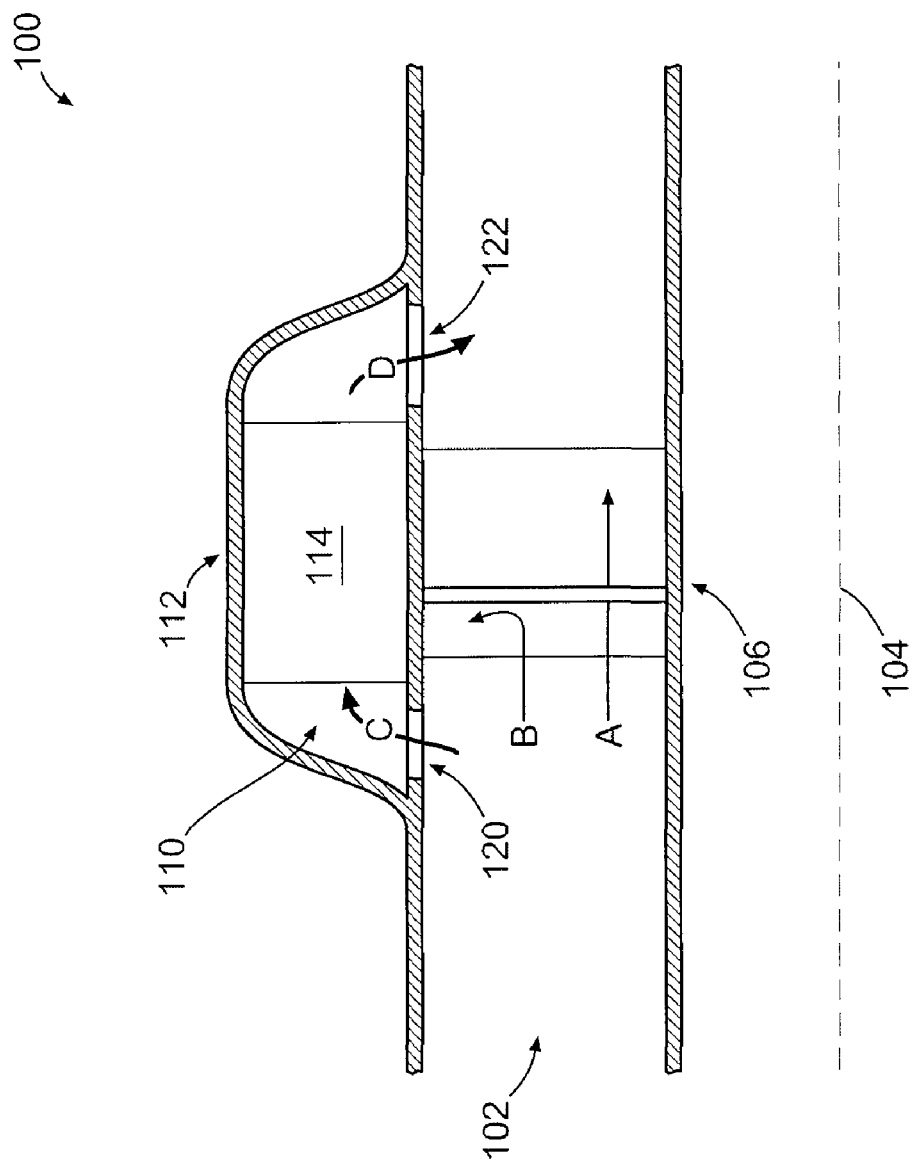
FIG. 1 is a schematic diagram depicting an exemplary embodiment of a heat exchange system for a gas turbine engine.

Referring now in more detail to the drawings, FIG. 1 is a schematic diagram depicting an exemplary embodiment of a gas turbine engine system involving heat exchange. As shown in FIG. 1, system 100 defines an annular gas flow path 102, which is located about a longitudinal axis 104. The flow of gas directed along gas flow path 102 can be associated with various features and/or components. By way of example, in some embodiments, the gas flow path can be associated with flow from a tertiary fan, inlet bleed air, a ram air scoop or an auxiliary power unit.

A flow restrictor 106 is positioned along the gas flow path for selectively restricting the flow of gas along the gas flow path 102. By way of example, an arrow A is depicted that shows a representative flow of gas responsive to the flow restrictor being in an open position. In contrast, arrow B depicts a representative flow of gas when the flow restrictor is in a closed position, i.e., at least a portion of the gas traveling along the gas flow path is prevented from passing through the flow restrictor.

The embodiment of FIG. 1 also incorporates an annular heat exchanger gas flow path 110 located radially outboard of annular gas flow path 102 and flow restrictor 106. A heat exchanger 112 is positioned within the heat exchanger gas flow path that incorporates one or more heat exchanger elements (e.g., element 114). Access to the heat exchanger is provided by an inlet valve assembly 120 (shown in an open position), which allows gas traveling along the gas flow path 102 to be redirected to the heat exchanger gas flow path (arrow C). After the heat exchanger, an outlet assembly 122 enables redirected gas to rejoin the annular gas flow path 102 downstream of the flow restrictor (arrow D).

In operation, the flow restrictor can be selectively controlled to exhibit the closed position and the inlet valve assembly can be controlled to the open position such that at least a portion of the gas traveling along the annular gas flow path is redirected to the heat exchanger gas flow path. That gas then transfers heat via the heat exchanger, which can use various fluids, such as oil or air, as an operating fluid. Thereafter, the gas rejoins the gas flow path via the outlet assembly. Notably, heat exchange functionality can be provided for one of more various purposes, such as transferring heat to a corresponding fluid provided to the heat exchanger and/or cooling the gases traveling along the gas flow path. Additionally, or alternatively, flow restrictor can be used to modulating pressure of the gas flow path such as for affecting operation of an upstream fan.

Figure 2:
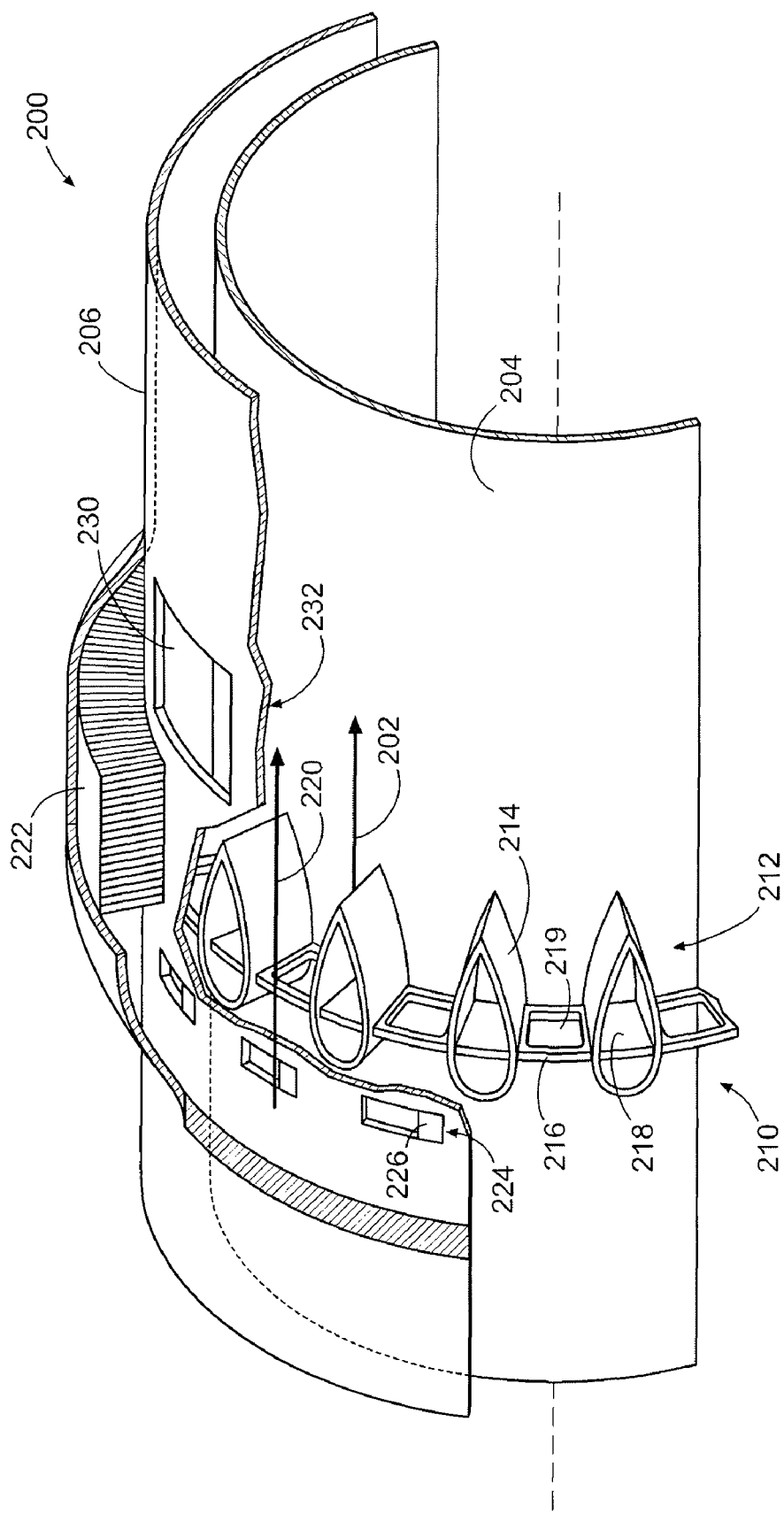
FIG. 2 is a schematic diagram depicting another exemplary embodiment of a heat exchange system for a gas turbine engine.

Another embodiment of a gas turbine engine system involving heat exchange is depicted schematically in FIG. 2. As shown in FIG. 2, system 200 includes an annular gas flow path 202 defined between adjacent casings 204, 206. A flow restrictor 210 is positioned along the gas flow path that includes a spaced, annular arrangement 212 of fairings (e.g., fairing 214). The fairings extend radially outwardly from the casing 204. The fairings function as supports for a barrier 216 that intersects the fairings at approximately a quarter chord location. In this embodiment, the barrier is a contiguous annular arrangement of alternating wall segments (e.g., segment 218) and openings (e.g., opening 219). The openings are sized and shaped so that an opening can fit entirely within a fairing when the barrier is moved to a fully closed position. Thus, in the fully closed position, the openings are no longer presented to the flow of gas flowing along the gas flow path 202.

Radially outboard of the fairings and barrier is an annular heat exchange gas flow path 220 along which multiple heat exchanger elements (e.g., heat exchanger element 222) are located. An inlet valve assembly 224 that includes an annular arrangement of valves (e.g., valve 226) selectively provides a flow of gas from the gas flow path 202 to the heat exchange gas flow path 220. Additionally, multiple gas outlets (e.g., outlet 230) of an outlet assembly 232 are located downstream of the heat exchanger elements. The outlet assembly permits gas directed into the heat exchange gas flow path 220 to rejoin the gas flow path 202.

In operation, the flow restrictor can be selectively controlled to exhibit the closed position and the inlet valve assembly can be controlled to the open position such that at least a portion of the gas traveling along the gas flow path 202 is redirected to the heat exchanger gas flow path 220. That gas then transfers heat via the heat exchanger, after which the gas rejoins the gas flow path 202 via the outlet assembly.

Figure 3:
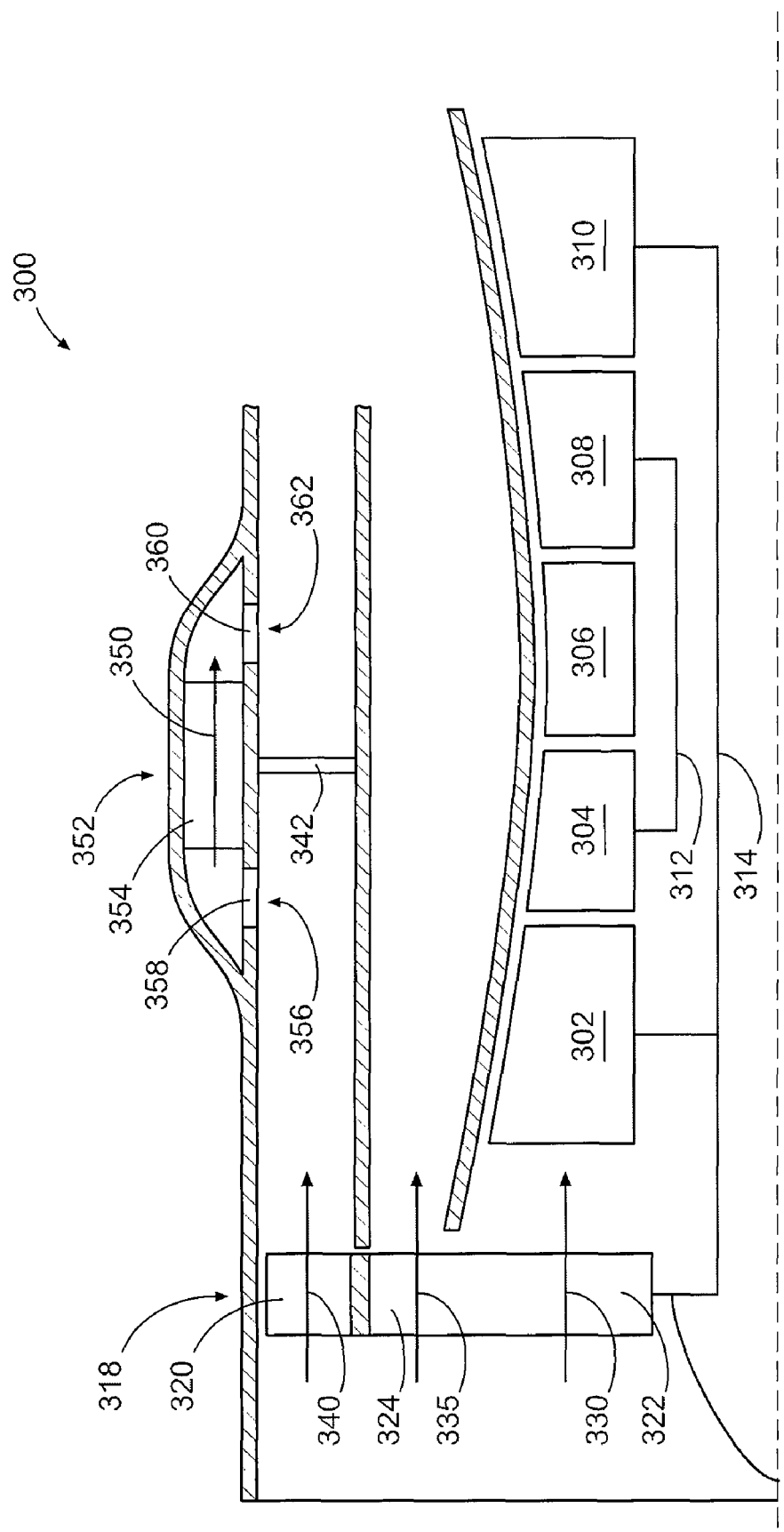
FIG. 3 is a schematic diagram depicting an exemplary embodiment of a gas turbine engine incorporating a heat exchange system.

FIG. 3 schematically depicts another embodiment of a gas turbine engine system involving heat exchange. As shown in FIG. 3, system 300 is configured as a dual-spool turbofan gas turbine engine. In particular, system 300 incorporates a low-pressure compressor 302, a high-pressure compressor 304, a combustion section 306, a high-pressure turbine 308 and a low-pressure turbine 310. The high-pressure turbine drives the high-pressure compressor via a shaft 312, and the low-pressure turbine drives the low-pressure compressor via a shaft 314.

Additionally, the embodiment of FIG. 3 includes a fan 318 that incorporates a tip rotor 320. The fan also is driven by the low-pressure turbine and includes an inner portion 322 and an intermediate portion 324. Although not shown in FIG. 3, the fan can be a multi-stage fan in some embodiments. Additionally or alternatively, the engine may incorporate a gearbox interposed between the shaft and the fan.

The compressors 302, 304, combustion section 306, turbines 308, 310 and inner portion 322 of the fan are located along an annular inner gas flow path 330. Intermediate portion 324 of the fan interacts with gas flowing along an annular intermediate gas flow path 335, which is located radially outboard of gas flow path 330. Tip rotor 320 interacts with gas flowing along an annular outer gas flow path 340, along which a flow restrictor 342 is positioned downstream of the tip rotor. The flow restrictor is selectively controllable to restrict the flow of gas along the gas flow path 340.

Radially outboard of outer gas flow path 340 is a heat exchange gas flow path 350 along which a heat exchanger 352 is located that includes multiple heat exchanger elements (e.g., heat exchanger element 354). An inlet assembly 356 that includes an annular arrangement of inlets (e.g., inlet 358) provides a flow of gas from the outer gas flow path 340 to the heat exchange gas flow path 350. Additionally, multiple gas outlets (e.g., outlet 360) of an outlet assembly 362 are located downstream of the heat exchanger elements. The outlet assembly permits gas directed into the heat exchange gas flow path to rejoin the outer gas flow path 340. Notably, both the inlet assembly and the outlet assembly can optionally include valves for providing controlled access to and/or from the heat exchange gas flow path.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A heat exchange system for a gas turbine engine comprising:
   a heat exchanger; and
   a flow restrictor operative to selectively restrict a flow of gas flowing along an annular gas flow path;
   in an open position, the flow restrictor enabling gas to flow along the gas flow path and, in a closed position, the flow restrictor restricting the flow of gas such that at least a portion of the gas is provided to the heat exchanger, the heat exchanger being located radially outboard of the flow restrictor.

2. The system of claim 1, wherein:
   the flow restrictor comprises an annular assembly of radially spaced fairings and movable wall segments; and
   in the closed position, each of the wall segments extends between a corresponding pair of adjacent ones of the fairings.

3. The system of claim 2, wherein, in the closed position, at least a portion of each of the wall segments is located within a corresponding one of the fairings.

4. The system of claim 2, wherein the wall segments extend transversely with respect to the gas flow path.

5. The system of claim 2, wherein the wall segments are positioned at approximately a quarter chord location with respect to the fairings.

6. The system of claim 2, wherein:
   the system comprises an annular barrier;
   the wall segments form spaced portions of the barrier; and
   the barrier has openings, each of the openings being located between an adjacent pair of the wall segments.

7. The system of claim 6, wherein a first of the openings is sized and shaped such that, in the open position, the first opening is positioned between a first pair of the fairings and, in the closed position, the first opening is surrounded by one of the fairings of the first pair.

8. The system of claim 1, wherein the heat exchanger comprises an annular assembly of heat exchanger elements.

9. The system of claim 1, further comprising an inlet valve assembly operative to selectively redirect the flow of gas such that, in an open position, the inlet valve assembly enables at least a portion of the gas to be provided to the heat exchanger.

10. The system of claim 9, wherein the inlet valve assembly is located upstream of the flow restrictor.

11. A gas turbine engine comprising:
    an annular gas flow path; and a heat exchange system having a heat exchanger and a flow restrictor;

the flow restrictor being located along the gas flow path and being operative to selectively restrict a flow of gas flowing along the gas flow path;

in an open position, the flow restrictor enabling gas to flow along the gas flow path and, in a closed position, the flow restrictor restricting the flow of gas such that at least a portion of the gas is provided to the heat exchanger.

12. The engine of claim 11, further comprising an inlet valve assembly operative to selectively redirect the flow of gas such that, in an open position, the inlet valve assembly enables at least a portion of the gas to be provided to the heat exchanger.

13. The engine of claim 11, wherein the heat exchanger is positioned along an annular heat exchanger gas flow path located radially outboard of the annular gas flow path.

14. The engine of claim 11, wherein:
the engine further comprises a tip rotor; and
the tip rotor is positioned along the annular gas flow path upstream of the flow restrictor.

15. The engine of claim 11, wherein:
the flow restrictor comprises an annular assembly of radially spaced fairings and movable wall segments; and in the closed position, each of the wall segments extends between a corresponding pair of adjacent ones of the fairings.

16. A method for providing heat exchange in a gas turbine engine comprising:
directing a flow of gas along an annular gas flow path;
selectively restricting the flow of gas;
redirecting at least a portion of the gas; and
extracting heat from the portion of the gas that was redirected.

17. The method of claim 16, further comprising influencing the flow of gas with a tip rotor of the gas turbine engine.

18. The method of claim 17, wherein selectively restricting the flow of gas occurs downstream of the tip rotor.

19. The method of claim 17, wherein selectively restricting the flow of gas is performed, at least in part, to control pressure of the flow of gas downstream of the tip rotor.

20. The method of claim 16, further comprising redirecting the portion of the gas that was redirected back to the annular gas flow path.

* * * * *